(12) United States Patent
Huang et al.

(10) Patent No.: US 9,665,123 B2
(45) Date of Patent: May 30, 2017

(54) ELECTRONIC DEVICE AND ROTATING BASE DRIVING METHOD

(75) Inventors: Chung-Yuan Huang, Taipei (TW);
Chia-Huang Chan, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 1145 days.

(21) Appl. No.: 13/615,601

(22) Filed: Sep. 14, 2012

(65) Prior Publication Data

US 2013/0070400 A1    Mar. 21, 2013

Related U.S. Application Data

(60) Provisional application No. 61/536,044, filed on Sep. 18, 2011.

(51) Int. Cl.
*H05K 5/00* (2006.01)
*H05K 7/00* (2006.01)
*A47G 1/00* (2006.01)
*G06F 1/16* (2006.01)

(52) U.S. Cl.
CPC .......... *G06F 1/1616* (2013.01); *G06F 1/1656* (2013.01); *G06F 1/1677* (2013.01)

(58) Field of Classification Search
CPC ................................................... H01R 12/447
USPC ...................... 361/679.01–679.03
See application file for complete search history.

(56) References Cited

U.S. PATENT DOCUMENTS

| | | | |
|---|---|---|---|
| 2008/0064238 A1* | 3/2008 | Reid | G06F 1/1616 439/142 |
| 2009/0262200 A1* | 10/2009 | Takabatake | G06F 1/1616 348/207.1 |

FOREIGN PATENT DOCUMENTS

| | | |
|---|---|---|
| TW | 200828003 | 7/2008 |
| TW | 201001144 | 1/2010 |
| TW | M380697 | 5/2010 |

OTHER PUBLICATIONS

"Office Action of Taiwan Counterpart Application", issued on Mar. 13, 2013, p. 1-p. 6.

* cited by examiner

*Primary Examiner* — Jerry Wu
(74) *Attorney, Agent, or Firm* — Jianq Chyun IP Office

(57) ABSTRACT

An electronic device including a first body, a rotating base, and a rotating base driving system is provided. The rotating base is pivoted to the first body and suitable for rotating between a using position and a retracting position with respect to the first body. The rotating base driving system is adapted to determine an operation status of the electronic device to control a movement of the rotating base with respect to the first body.

25 Claims, 9 Drawing Sheets

ELECTRONIC DEVICE AND ROTATING BASE DRIVING METHOD

CROSS-REFERENCE TO RELATED APPLICATION

This application claims the priority benefits of U.S. provisional application Ser. No. 61/536,044, filed on Sep. 18, 2011. The entirety of the above-mentioned patent applications is hereby incorporated by reference herein and made a part of this specification.

BACKGROUND OF THE INVENTION

Field of the Invention

The present invention generally relates to a rotating base driving system, in particular, to a rotating base driving system suitable for an electronic device.

Description of Related Art

Through the development of technology industry in recent years, electronic products such as laptop computers, smart phones, tablet computers are becoming ubiquitous in daily life. The conveniences and practicalities associated with all sorts of types and functionalities have increased the popularity of these electronic products.

As an example, a laptop computer includes a variety of connection ports for connecting external devices or external plugs such as an external hard drive, an internet cable, and a power supply. Such connection ports are normally positioned on either side of the laptop computer allowing a user to conveniently connect external devices to the connection ports. However, the functionality of the connection ports positioned on either side of the laptop computer may be easily affected by contamination due to dust upon long exposure to the air. Moreover, the arrangement of the connection ports on either side of the laptop computer may affect the appearance.

In this connection, a rotating base rotating with respect to the mainframe comes pre-installed with some laptop computers, and the connection ports are arranged on the rotating base. When the rotating base rotates to a retracting position, the connection ports are concealed in the mainframe for a more aesthetical appearance. The user may rotate the rotating base to a using position, and the connection ports are then exposed allowing the user to connect external devices to the connection ports. If the rotating base rotates to the retracting position with at least one external devices connecting to the connection port, then the rotating base may not move smoothly due to the interference with the external devices, and the connection ports or the external devices may result in structural damage from squeezes. Moreover, if the user's fingers inadvertently come into contact between the rotating base and the mainframe, then the fingers may get injured and thus the safety will be called into question during usage.

SUMMARY OF THE INVENTION

Accordingly, the present invention is directed to a rotating base driving system adapted to control a position of a rotating base based on an operation status of an electronic device.

The present invention is directed to an electronic device comprising a first body, a rotating base, and a rotating base driving system. The rotating base is pivoted to the first body and suitable for rotating between a using position and a retracting position with respect to the first body. The rotating base driving system is adapted to determine an operation status of the electronic device and control a movement of the rotating base with respect to the first body.

According to an embodiment of the present invention, the rotating base driving system includes a determining module, a control unit, and a driving unit. The determining module generates a determining signal based on the operation status of the electronic device. The control unit generates a control signal based on the determining signal. The driving unit controls a position of the rotating base based on the control signal.

According to an embodiment of the present invention, the operation status includes an operating mode of the first body, a position of the rotating base and a connection status of a connection port of the rotating base.

According to an embodiment of the present invention, the connection port is concealed in the first body when the rotating base is located at the retracting position, and the first body exposes the connection port when the rotating base is located at the using position.

According to an embodiment of the present invention, the determining module receives the operating mode of the first body, the position of the rotating base and the connection status of the connection port sequentially to generate a determining signal.

According to an embodiment of the present invention, the driving unit drives the rotating base to rotate to the using position when the operating mode of the first body is a working mode or a power-off mode and the position of the rotating base is the retracting position.

According to an embodiment of the present invention, the driving unit drives the rotating base to rotate to the retracting position when the operating mode of the first body is a working mode or a power-off mode, the position of the rotating base is the using position and the connection status of the connection port is a without plug state.

According to an embodiment of the present invention, the driving unit controls the rotating base to stay at the using position when the operating mode of the first body is a working mode or a power-off mode, the position of the rotating base is the using position and the connection status of the connection port is a with plug state.

According to an embodiment of the present invention, the driving unit does not drive the rotating base and the first body switches to a power-off mode when the operating mode of the first body is that the first body receives a power-off instruction under a working mode and the position of the rotating base is the retracting position.

According to an embodiment of the present invention, the driving unit drives the rotating base to rotate to the retracting position and the first body switches to a power-off mode when the operating mode of the first body is that the first body receives a power-off instruction under a working mode, the position of the rotating base is the using position and the connection status of the connection port is a without plug state.

According to an embodiment of the present invention, the operation status further includes a power supply method for the first body, wherein the driving unit controls the rotating base to stay at the using position and the first body remains in the working mode when the power supply method for the first body is a AC supply mode, the operating mode of the first body is that the first body receives a power-off instruction under a working mode, the position of the rotating base is the using position and the connection status of the connection port is a with plug state.

According to an embodiment of the present invention, the operation status further includes a power supply method for the first body and a battery power of the electronic device, wherein the driving unit controls the rotating base to stay at the using position and the first body switches to a power-off mode after a predetermined time period when the power supply method is a DC supply mode, the operating mode of the first body is that the first body receives a power-off instruction under a working mode, the position of the rotating base is the using position, the connection status of the connection port is a with plug state and the battery power is lower than a predetermined value.

According to an embodiment of the present invention, the electronic device further includes a second body, and the second body is pivoted to the first body and suitable for pivotally rotating between a raised position and a closed position with respect to the first body; wherein the first body receives a sleep instruction when the second body pivotally rotates from the raised position to the closed position.

According to an embodiment of the present invention, the operation status further includes a power supply method for the first body, a position of the second body and a battery power of the electronic device, wherein the driving unit does not drive the rotating base and the first body switches to a sleep mode when the power supply method is a DC supply mode, the operating mode of the first body is that the first body receives a sleep instruction under a working mode, the position of the second body is the closed position and the battery power is lower than a predetermined value.

According to an embodiment of the present invention, the operation status further includes a power supply method for the first body and a position of the second body, wherein the driving unit does not drive the rotating base and the first body switches to a sleep mode when the power supply method is a DC supply mode, the operating mode of the first body is that the first body receives a sleep instruction under a working mode, the position of the second body is the raised position and the position of the rotating base is the retracting position.

According to an embodiment of the present invention, the operation status further includes a power supply method for the first body and a position of the second body, wherein the driving unit drives the rotating base to rotate to the retracting position and the first body switches to a sleep mode when the power supply method is a DC supply mode, the operating mode of the first body is that the first body receives a sleep instruction under a working mode, the position of the second body is the raised position, the position of the rotating base is the using position and the connection status of the connection port is a without plug state.

According to an embodiment of the present invention, the operation status further includes a power supply method for the first body, a position of the second body and a battery power of the electronic device, wherein the driving unit controls the rotating base to stay at the using position and the first body switches to a power-off mode after a predetermined time period when the power supply method is a DC supply mode, the operating mode of the first body is that the first body receives a sleep instruction under a working mode, the position of the second body is the raised position, the position of the rotating base is the using position, the connection status of the connection port is a with plug state and the battery power is lower than a predetermined value.

According to an embodiment of the present invention, the operation status further includes a power supply method for the first body, wherein the driving unit does not drive the rotating base and the first body remains in the working mode when the power supply method for the first body is a AC supply mode and the operating mode of the first body is that the first body receives a sleep instruction under a working mode.

According to an embodiment of the present invention, the operation status includes a position of the rotating base, and the determining module includes a detecting unit adapted to detect the position of the rotating base.

According to an embodiment of the present invention, the detecting unit includes a variable resistor, the variable resistor is coupled between the first body and the rotating base, a voltage of the variable resistor changes along with a rotation of the rotating base with respect to the first body, and the detecting unit detects whether the rotating base is located at the using position or the retracting position based on the voltage.

According to an embodiment of the present invention, the driving unit includes a motor, wherein a rotation angle of the motor and the voltage correspond to a predetermined relationship when a rotation status of the motor is that the motor rotates at a predetermined rotating speed to drive the rotating base to rotate, and the determining module receives the rotation status of the motor as not being rotating at the predetermined rotating speed when the rotation angle of the motor and the voltage does not correspond to the predetermined relationship.

According to an embodiment of the present invention, the driving unit drives the rotating base to rotate to the using position when the rotating base rotates from the using position to the retracting position and the rotation status of the motor is that the motor does not rotate at the predetermined rotating speed, and the driving unit drives the rotating base to rotate to the retracting position when the rotating base rotates from the retracting position to the using position and the rotation status of the motor is that the motor does not rotate at the predetermined rotating speed.

According to an embodiment of the present invention, the detecting unit includes a lid switch, a capacitor proximity sensor, a photodiode sensor, a pressure sensor, a force sensor or a metal dome.

According to an embodiment of the present invention, the operation status includes a connection status of a connection port of the rotating base, and the determining module includes a detecting unit adapted to detect the connection status of the connection port.

According to an embodiment of the present invention, the detecting unit includes a lid switch, an infrared transmitter sensor, or a detect pin.

According to an embodiment of the present invention, the driving unit includes a motor; wherein the rotating base rotates from the using position to the retracting position within a predetermined time period when the rotation status of the motor is that the motor rotates at a predetermined rotating speed to drive the rotating base to rotate, and the connection status received by the determining module is a with plug state when the detecting unit does not detect the rotating base rotating to the retracting position within the predetermined time period.

According to an embodiment of the present invention, the driving unit drives the rotating base to rotate to the using position when the rotating base rotates from the using position to the retracting position and the connection status of the connection port is a with plug state.

The present invention is directed to a rotating base driving method suitable for an electronic device, wherein the electronic device includes a first body and a rotating base, the rotating base is pivoted to the first body and suitable for rotating between a using position and a retracting position with respect to the first body. First, an operation status of the electronic device is received, wherein the operation status includes a position of the rotation base. Then, a control signal is generated according to the operation status. Then, whether to rotate the rotating base is determined based on the control signal.

According to an embodiment of the present invention, the operation status includes receiving a key-pressed signal.

According to an embodiment of the present invention, the operation status further includes an operating mode of the first body and a battery power of the electronic device.

According to an embodiment of the present invention, the control signal drives the rotating base to rotate to the using position when the position of the rotating base is the retracting position and the operating mode of the first body is a working mode or a power-off mode.

According to an embodiment of the present invention, the control signal does not drive the rotating base and keeps the rotating base at the retracting position when the position of the rotating base is the retracting position, the operating mode of the first body is a sleep mode and the battery power is lower than a predetermined value.

According to an embodiment of the present invention, the operation status further includes a connection status of a connection port of the rotating base.

According to an embodiment of the present invention, the control signal drives the rotating base to rotate to the retracting position when the position of the rotating base is the using position and the connection status of the connection port is a without plug state.

According to an embodiment of the present invention, the control signal does not drive the rotating base and keeps the rotating base at the using position when the position of the rotating base is the using position and the connection status of the connection port is a with plug state.

According to an embodiment of the present invention, when the position of the rotating base is the using position, a connection status of a connection port of the rotating base is determined if the operating mode of the first body is that the first body receives a sleep instruction or a power-off instruction under a working mode or if a battery power of the electronic device is lower than a predetermined value, wherein the control signal drives the rotating base to rotate to the retracting position if the connection status of the connection port is a without plug state.

According to an embodiment of the present invention, when the position of the rotating base is the using position, a connection status of a connection port of the rotating base is determined if the operating mode of the first body is that the first body receives a sleep instruction or a power-off instruction under a working mode or if a battery power of the electronic device is lower than a predetermined value, wherein the control signal does not drive the rotating and keeps the rotating base at the using position if the connection status of the connection port is a with plug state.

Based on the above description, the electronic device in the present invention determines the operation status of the electronic device via the rotating base driving system thereof, so as to control the position of the rotating base based on the operation status of the electronic device. Through this, the rotating base is capable of automatically and properly rotating towards the retracting position or the using position in response to each operation status of the electronic device for the enhancement of convenience and safety in the operating of the electronic device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
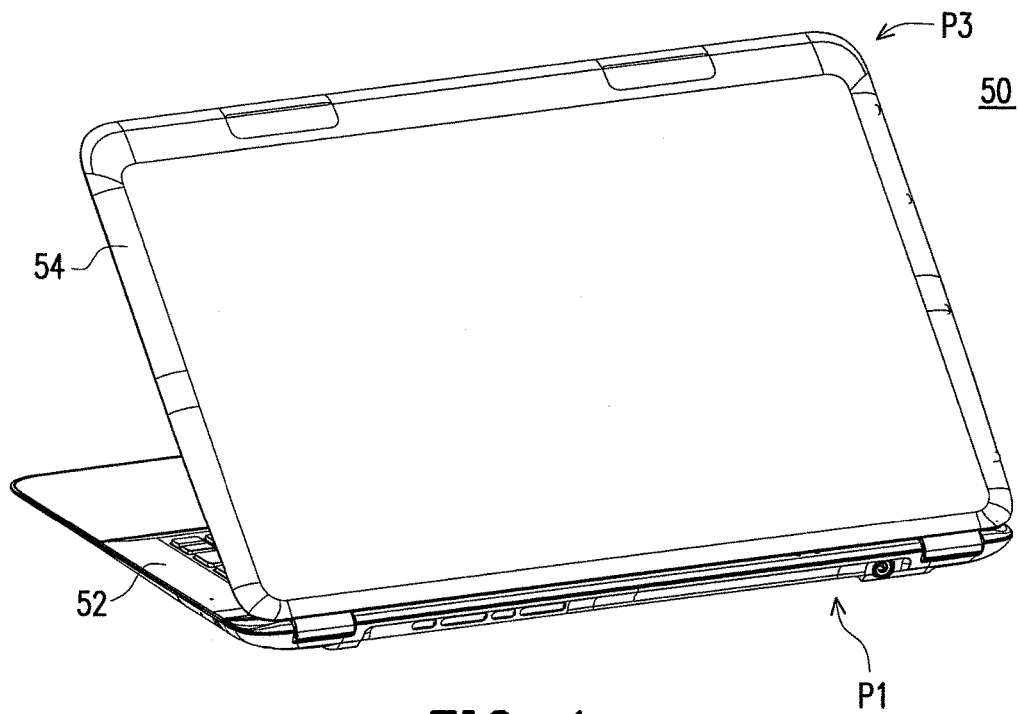
FIG. 1 is a perspective view of an electronic device in accordance with an embodiment of the prevent invention.

Reference will now be made in detail to the present embodiments of the invention, examples of which are illustrated in the accompanying drawings. Wherever possible, the same reference numbers are used in the drawings and the description to refer to the same or like parts.

Figure 2:
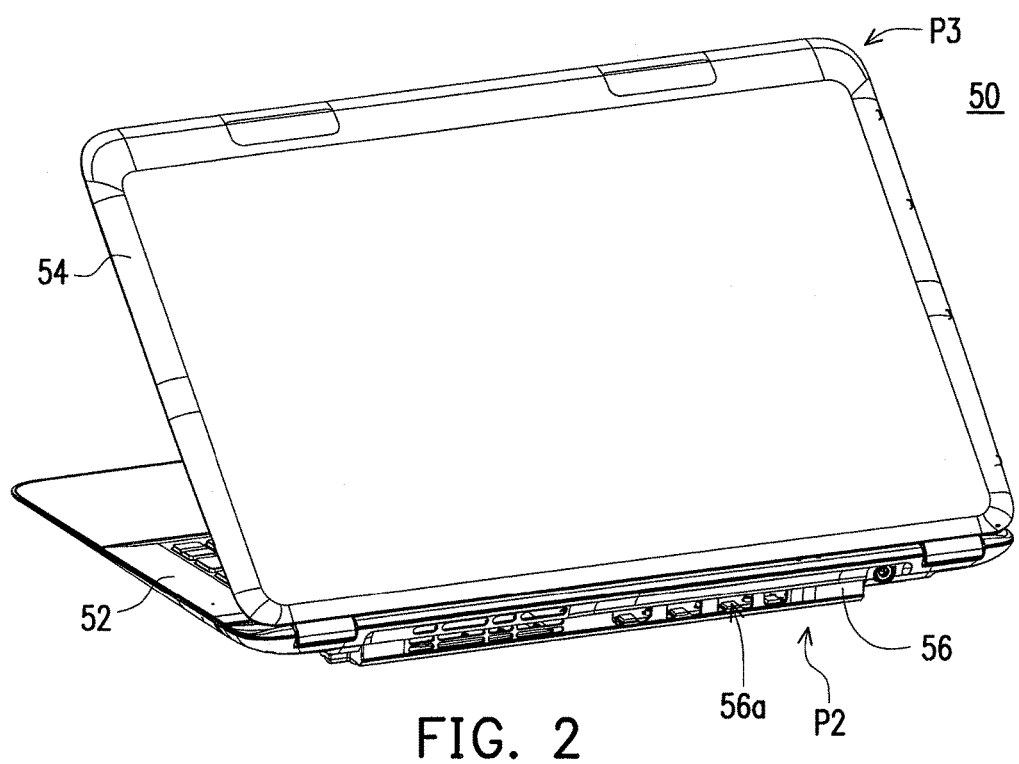
FIG. 2 is a perspective view of a rotating base rotating with respect to a first body in FIG. 1.

FIG. 1 is a perspective view of an electronic device in accordance with an embodiment of the prevent invention. FIG. 2 is a perspective view of a rotating base rotating with respect to a first body in FIG. 1. Referring to FIG. 1 and FIG. 2, the electronic device 50 in the present embodiment may be, for example, a laptop computer including a first body 52, a second body 54, and a rotating base 56. The first body 52 and the second body 54 may be, for example, a mainframe and a display respectively, wherein the second body 54 is pivoted to the first body 52 and suitable for rotating to raise or close with respect to the first body 52. The rotating base 56 is pivoted to the first body 52 and suitable for rotating between a retracting position P1 in FIG. 1 and a using position P2 in FIG. 2 with respect to the first body 52. The rotating base 56 includes a connection port 56a, wherein the connection port 56a is concealed in the first body 52 while the rotating base 56 is located at the retracting position P1 illustrated in FIG. 1, and wherein the connection port 56a is exposed outside the first body 52 while the rotating base 56 is located at the using position P2 illustrated in FIG. 2.

Figure 3:
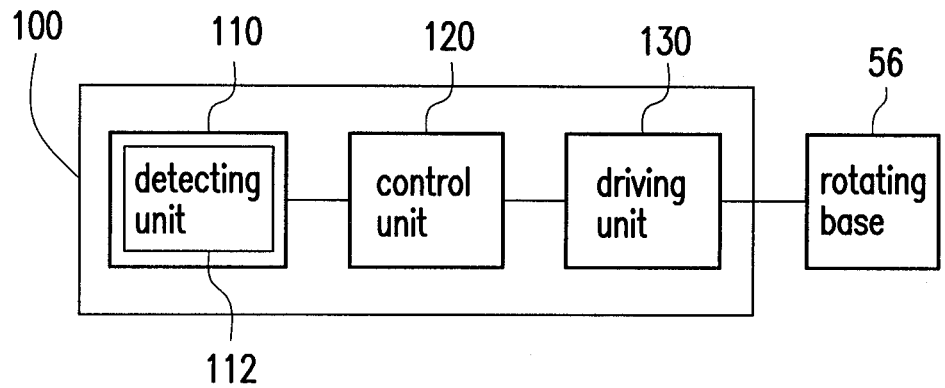
FIG. 3 is a block diagram of a rotating base driving system in accordance with an embodiment of the present invention.

FIG. 3 is a block diagram of a rotating base driving system in accordance with an embodiment of the present invention.

Referring to FIG. 1 to FIG. 3, the rotating base driving system 100 in the present embodiment is suitable for the electronic device 50 illustrated in FIG. 1 and FIG. 2 and is adapted to determine an operation status of the electronic device 50 and further control a movement of the rotating base 56 with respect to the first body 52. The rotating base driving system 100 includes a determining module 110, a control unit 120, and a driving unit 130. The determining module 110 is adapted to generate a determining signal based on the operation status of the electronic device 50, the control unit 120 is adapted to generate a control signal based on the determining signal from the determining module 110, and the driving unit 130 is adapted to control a position of the rotating base 56 based on the control signal from the control unit 120. The driving unit 130 in the present embodiment includes, for example, but not limited to, a motor arranged on the rotating base 56. The driving unit 130 in other embodiments may be other suitable types of driving devices arranged in other proper positions in the electronic device 50.

To be more detailed, the operation status of the electronic device 50 includes an operating mode of the first body 52, a position of the rotating base 56, and a connection status of the connection port 56a. The determining module 110, for example, receives the operating mode of the first body 50, the position of the rotating base 56, and the connection status of the connection port 56a sequentially, and then generates the determining signal enabling the driving module 130 to control the position of the rotating base 56 based on the operation status of the electronic device 50. Through this, the rotating base 56 is capable of automatically and properly rotating towards the retracting position P1 or using position P2 in response to each operation status of the electronic device 50 for the enhancement of convenience and safety in the handling of the electronic device 50. The driving method of the rotating base 56 from the rotating base driving system 100 will be described in more details below.

Figure 4:
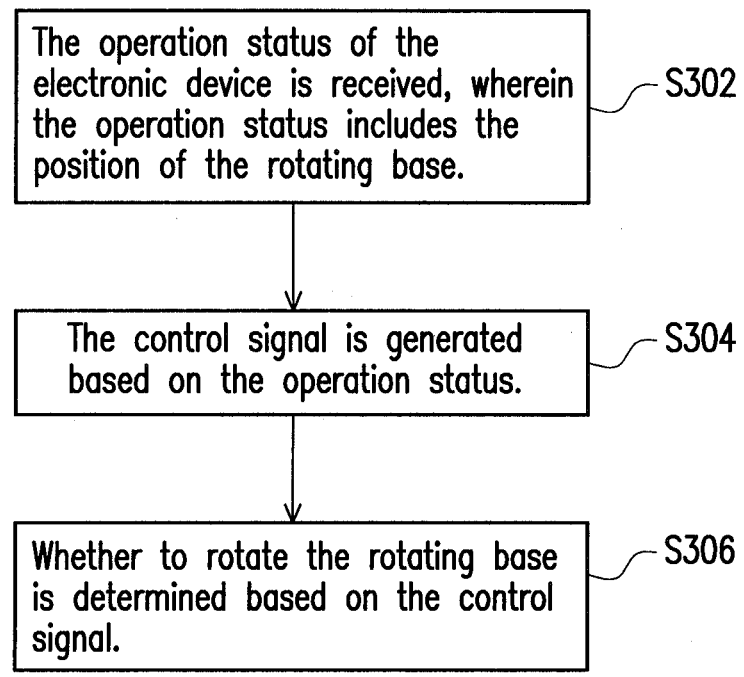
FIG. 4 is a step diagram of a rotating base driving method in accordance with an embodiment of the present invention.

FIG. 4 is a step diagram of a rotating base driving method in accordance with an embodiment of the present invention. Referring to FIG. 1 to FIG. 4, firstly, the operation status of the electronic device 50 is received, wherein the operation status includes the position of the rotating base 56 (Step S302). Next, the control signal is generated based on the operation status (Step S304). Then, whether to rotate the rotating base 56 is determined based on the control signal (Step S306).

The electronic device 50 includes, for example, a key adapted to trigger the rotating base driving system 100 for a user to press on. In the above Step S302, the user are able to press the key, allowing the rotating base driving system 100 to receive the operation status of the electronic device 50 via the key-pressed signal.

The operation status further includes the operating mode of the first body 52, a battery power of the electronic device 50, and the connection status of the connection port 56a of the rotating base 56. The following table identifies the process of the rotating base driving method in the present embodiment based on the operating mode of the first body 52, the battery power of the electronic device 50, and the connection status of the connection port 56a of the rotating base 56.

| | rotating base | | |
|---|---|---|---|
| work mode | retracting position | using position/ without plug | using position/ with plug |
| working mode | using position | retracting position | using position |
| power-off mode | using position | retracting position | using position |
| sleep mode/ low battery | retracting position | retracting position | using position |

As listed on the above table, when the position of the rotating base 56 is the retracting position and the operating mode of the first body 52 is a working mode or a power-off mode, the user is allowed to press the key and drive the rotating base 56 in rotation to the using position via the control signal. When the position of the rotating base 56 is the retracting position, the operating mode of the first body 52 is in a sleep mode, and the battery power is lower than a predetermined value, the control signal will not drive the rotating base 56 and thus the rotating base 56 will be kept at the retracting position for reducing the electricity consumption. When the position of the rotating base 56 is the using position and the connection status of the connection port 56a is a without plug state, the user is able to press the key, such that the rotating base 56 is driven to the retracting position via the control signal. When the position of the rotating base 56 is the using position and the connection status of the connection port 56a is a with plug state, the control signal will not drive the rotating base 56 and thus the rotating base 56 will remain at the using position for preventing the rotating base 56 from interferences with external devices (or external plugs), which result in structural damage.

Moreover, when the position of the rotating base 56 is the using position, if the operating mode of the first body 52 is that the first body 52 receives a sleep instruction or a power-off instruction under the working mode, or if the battery power of the electronic device 50 is lower than the predetermined value, then the rotating base driving system 100 will determine the connection status of the connection port 56a of the rotating base 56. If the connection status of the connection port 56a is a without plug state, then the control signal will drive the rotating base 56 in rotation to the retracting position. Conversely, if the connection status of the connection port 56a is a with plug state, then the control signal will not drive the rotating and the rotating base 56 will remain at the using position for preventing the rotating base 56 from interferences with external plugs (such as USB connectors and RJ45 connectors) or external devices (such as card readers or flash drives), which result in structural damage.

Each step in the process flow of the rotating base driving system 100 will be descried concretely hereinafter.

Figure 5:
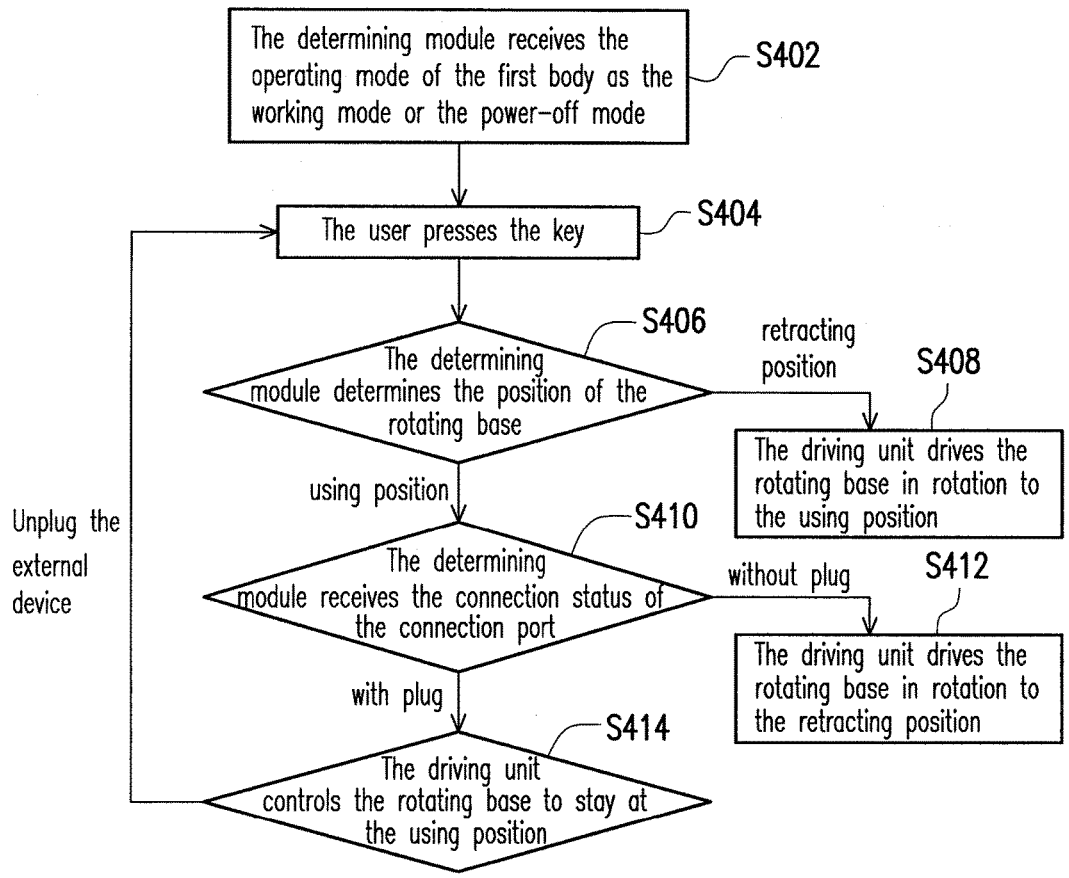
FIG. 5 is a flow chart of the rotating base driving system driving the rotating base in FIG. 3.
Figure 6:
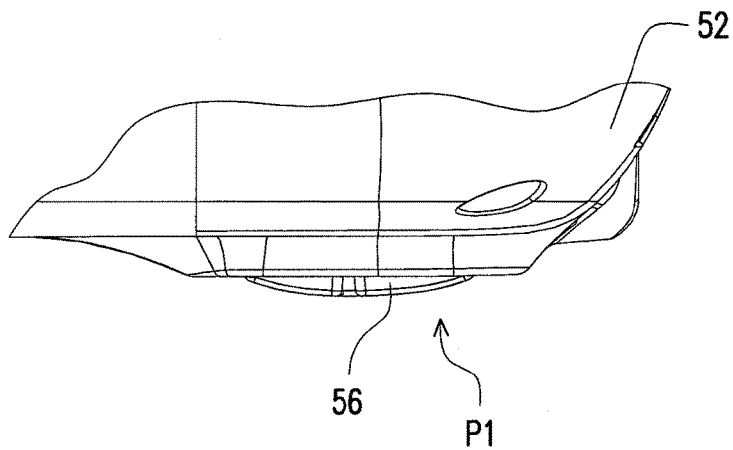
FIG. 6 is a partial side view of the electronic device in FIG. 1.
Figure 7:
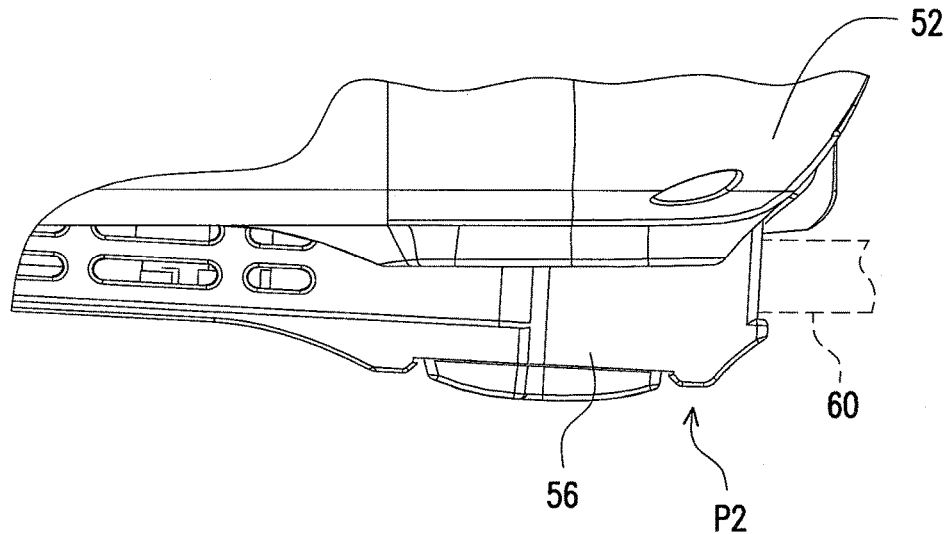
FIG. 7 is a partial side view of the electronic device in FIG. 2.

If the user chooses to raise or close the rotating base 56 in the working mode or the power-off mode of the electronic devices 50, the rotating base 56 will be able to be controlled by the rotating base driving system 100 through the following flow. FIG. 5 is a flow chart of the rotating base driving system 100 driving the rotating base in FIG. 3. Referring to FIG. 1 to FIG. 5, under the condition that the determining module 110 receives the operating mode of the first body 52 as the working mode or the power-off mode (Step 402), the user presses the key (Step S404) to trigger the determining module 110 to determine the position of the rotating base 56 (Step S406). If the position of the rotating base 56 is the retracting position P1, then the determining module 110 will transmit the determining signal to the control module 120, and the control unit 120 will further transmit the control signal to the driving unit 130, enabling the driving unit 130 to drive the rotating base 56 in rotation to the using position P2 (Step S408). FIG. 6 is a partial side view of the electronic device in FIG. 1. FIG. 7 is a partial side view of the electronic device in FIG. 2. When the driving unit 130 drives the rotating base 56 in the above step S408, the rotating base 56 will rotate to the using position P2 in FIG. 7 from the retracting position P1 in FIG. 6 and expose the connection port 56a (in FIG. 2) on the rotating base 56 for providing the connection for the external device 60.

In the step S406, if the determining module 110 determines the position of the rotating base 56 is the using position P2, then the determining module 110 will receive the connection status of the connection port 56a (Step S410). If the connection status of the connection port 56a is a without plug state, then the determining module 110 will transmit the determining signal to the control module 120 and the control unit 120 will further transmit the control signal to the driving unit 130, enabling the driving unit 130 to drive the rotating base 56 in rotation to the retracting position P1 (Step S412), and thus the connection port 56a on the rotating base will be concealed in the first body 52.

In the step S410, if the connection status of the connection port 56a received by the determining module 10 is a with plug state, then the driving unit 130 will control the rotating base 56 to stay at the using position P2 as illustrated in FIG. 7 (Step S414). Through this, the rotating base 56 will not rotate to the retracting position P1 while the external device 60 is with plug to the connection port 56a, and thus the connection port 56a or the external device 60 may be prevented from damage due to squeezes during the rotation. During the process of the step S414, a warning may be displayed on the display screen of the second body 54 of the electronic device 50 for warning the user to unplug the external device 60. After the user unplugs the external device 60, the user is able to press the key again (Step 404), and thus the rotating base driving system 100 will retract the rotating base 56 through the steps S406, S410, and S412.

Figure 8:
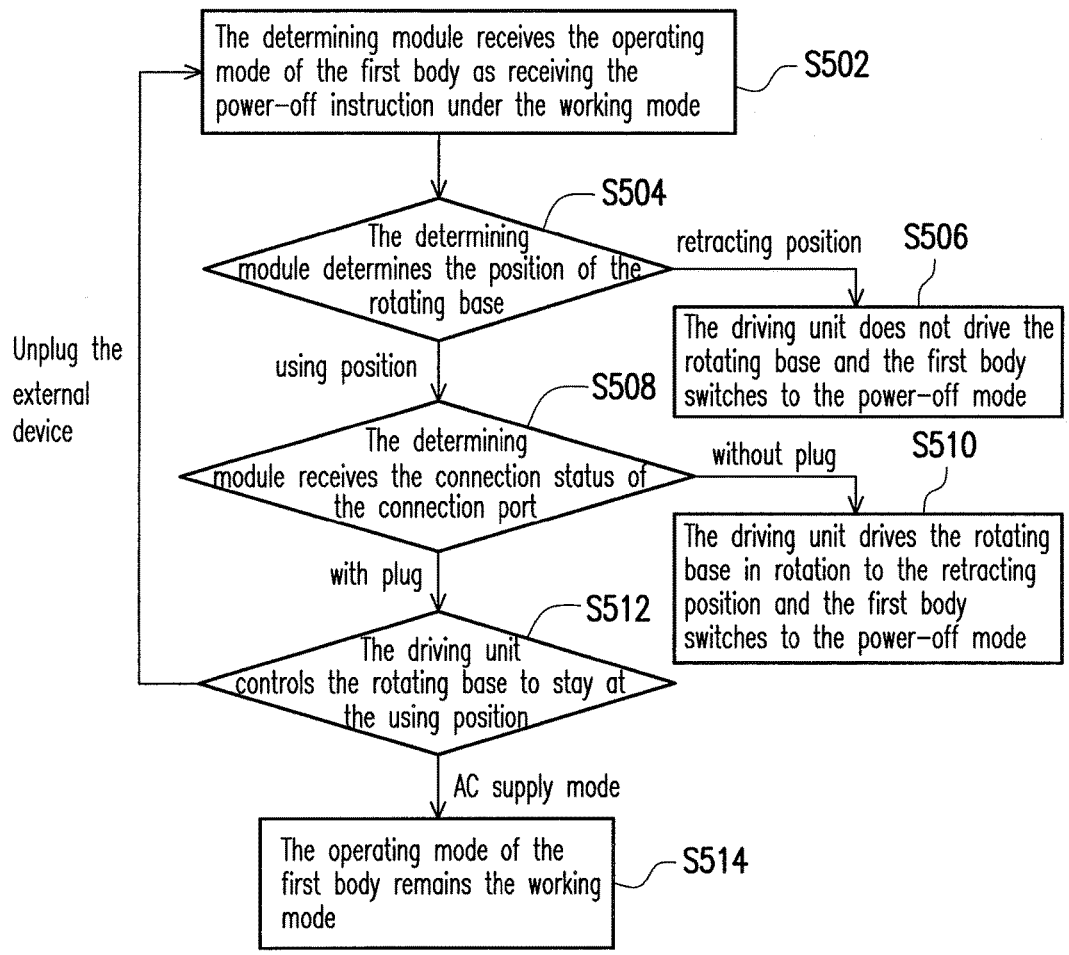
FIG. 8 is a flow chart of the rotating base driving system driving the rotating base in FIG. 3.

If the user chooses to switch from the working mode to the power-off mode of the electronic device 50, the rotating base 56 is able to be controlled by the rotating base driving system 100 through the following flow. FIG. 8 is a flow chart of the rotating base driving system driving the rotating base in FIG. 3. Referring to FIG. 1 to FIG. 3 and FIG. 8, when the determining module 110 receives the operating mode of the first body 52 as receiving the power-off instruction under the working mode (Step S502), the determining module 110 will determine the position of the rotating base 56 (Step S504). If the position of the rotating base 56 is the retracting position P1, then the driving unit 130 will not drive the rotating base 56 and the first body 52 will switch to the power-off mode (Step S506).

In the step S504, if the determining module 110 determines the position of the rotating base 56 is the using position P2, then the determining module 110 will receive the connection status of the connection port 56a (Step S508). If the connection status of the connection port 56a is a without plug state, then the determining module 110 will transmit the determining signal to the control module 120 and the control unit 120 will further transmit the control signal to the driving unit 130, such that the driving unit 130 drives the rotating base 56 in rotation to the retracting position P1 and the first body 52 switches to the power-off mode (Step S510), and thus the connection port 56a on the rotating base will be concealed in the first body 52 as the electronic device 50 shuts down.

In the step S508, if the connection status of the connection port 56a received by the determining module 10 is a with plug state, then the driving unit 130 will control the rotating base 56 to stay at the using position P2 as illustrated in FIG. 7 (Step S512). Through this, the rotating base 56 will not rotate to the retracting position P1 while the external device 60 is with plug to the connection port 56a, and thus the connection port 56a or the external device 60 may be prevented from damage due to squeezes during the rotation. During the process of the step S512, a warning may be displayed on the display screen of the second body 54 of the electronic device 50 for warning the user to unplug the external device 60. After the user unplugs the external device 60, the rotating base driving system 100 will retract the rotating base 56 through the steps S504, S508, and S510, and shut down the electronic device 50. In the present embodiment, the operation mode of the electronic device 50 further includes a power supply method for the first body 52. Under the condition that the power supply method for the first body 52 received by the determining module 110 is a AC supply mode, since the electronic device 50 will not be forced to shut down due to low battery, after the completion of the Step S512, the operating mode of the first body 52 will remain the working mode (Step S514) and the external device 60 will be waited to be unplug by the user.

Figure 9:
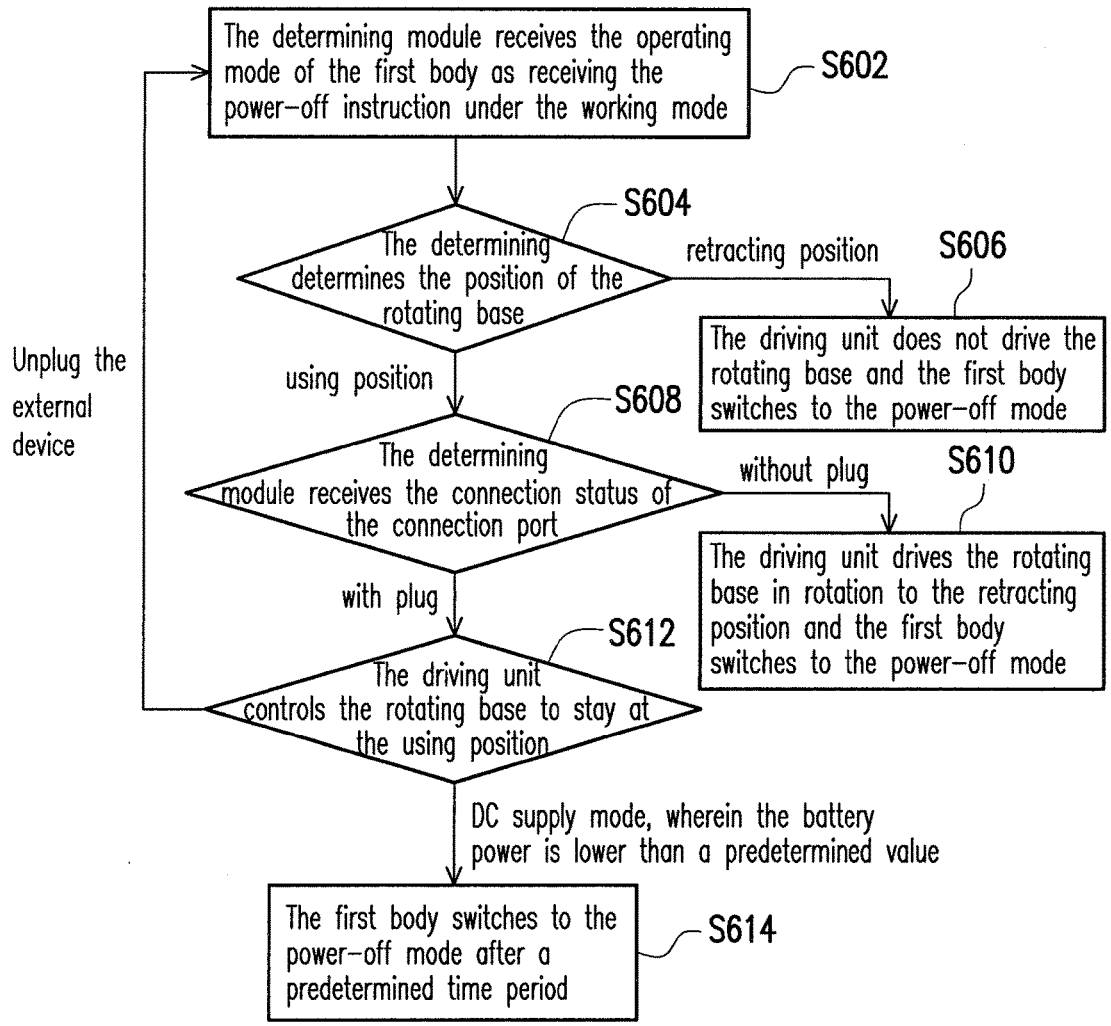
FIG. 9 is a flow chart of the rotating base driving system driving the rotating base in FIG. 3.

When the user chooses to switch from the working mode to the power-off mode of the electronic device 50, the rotating base 56 is able to be controlled by the rotating base driving system 100 through the following flow. FIG. 9 is a flow chart of the rotating base driving system driving the rotating base in FIG. 3. Referring to FIG. 1 to FIG. 3 and FIG. 9, when the determining module 110 receives the operating mode of the first body 52 as receiving the power-off instruction under the working mode (Step S602), the determining 110 will determine the position of the rotating base 56 (Step S604). If the position of the rotating base 56 is the retracting position P1, then the driving unit 130 will not drive the rotating base 56 and the first body 52 will switch to the power-off mode (Step S606).

In the step S604, if the determining module 110 determines the position of the rotating base 56 is the using position P2, then the determining module 110 will receive the connection status of the connection port 56a (Step S608). If the connection status of the connection port 56a is a without plug state, then the determining module 110 will transmit the determining signal to the control module 120 and the control unit 120 will further transmit the control signal to the driving unit 130, such that the driving unit 130 drives the rotating base 56 in rotation to the retracting position P1 and the first body 52 switches to the power-off mode (Step S610), and thus the connection port 56a on the rotating base will be concealed in the first body 52 as the electronic device 50 shuts down.

In the step S608, if the connection status of the connection port 56a received by the determining module 10 is a with plug state, then the driving unit 130 will control the rotating base 56 to stay at the using position P2 as illustrated in FIG. 7 (Step S612). Through this, the rotating base 56 will not rotate to the retracting position P1 while the external device 60 is with plug to the connection port 56a, and thus the connection port 56a or the external device 60 may be prevented from damage due to squeezes during the rotation. During the process of the step S612, a warning may be displayed on the display screen of the second body 54 of the electronic device 50 for warning the user to unplug the external device 60. After the user unplugs the external device 60, the rotating base driving system 100 will retract the rotating base 56 through the steps S602, S604, S608, and S610, and the electronic device 50 is shut down. In the present embodiment, the operation mode of the electronic device 50 further includes a power supply method for the first body 52 and a battery power of the electronic device 50. Under the condition that the power supply method for the first body 52 received by the determining module 110 is the DC supply mode and the battery power is lower than a predetermined value, after the completion of the Step S612, the first body 52 will switch to the power-off mode after a predetermined time period (Step S614), which will prevent the electronic device 50 from being forced to shut down due to low battery. The predetermined time period may be, for example, but not limited to, 60 seconds or other suitable time period.

Figure 10:
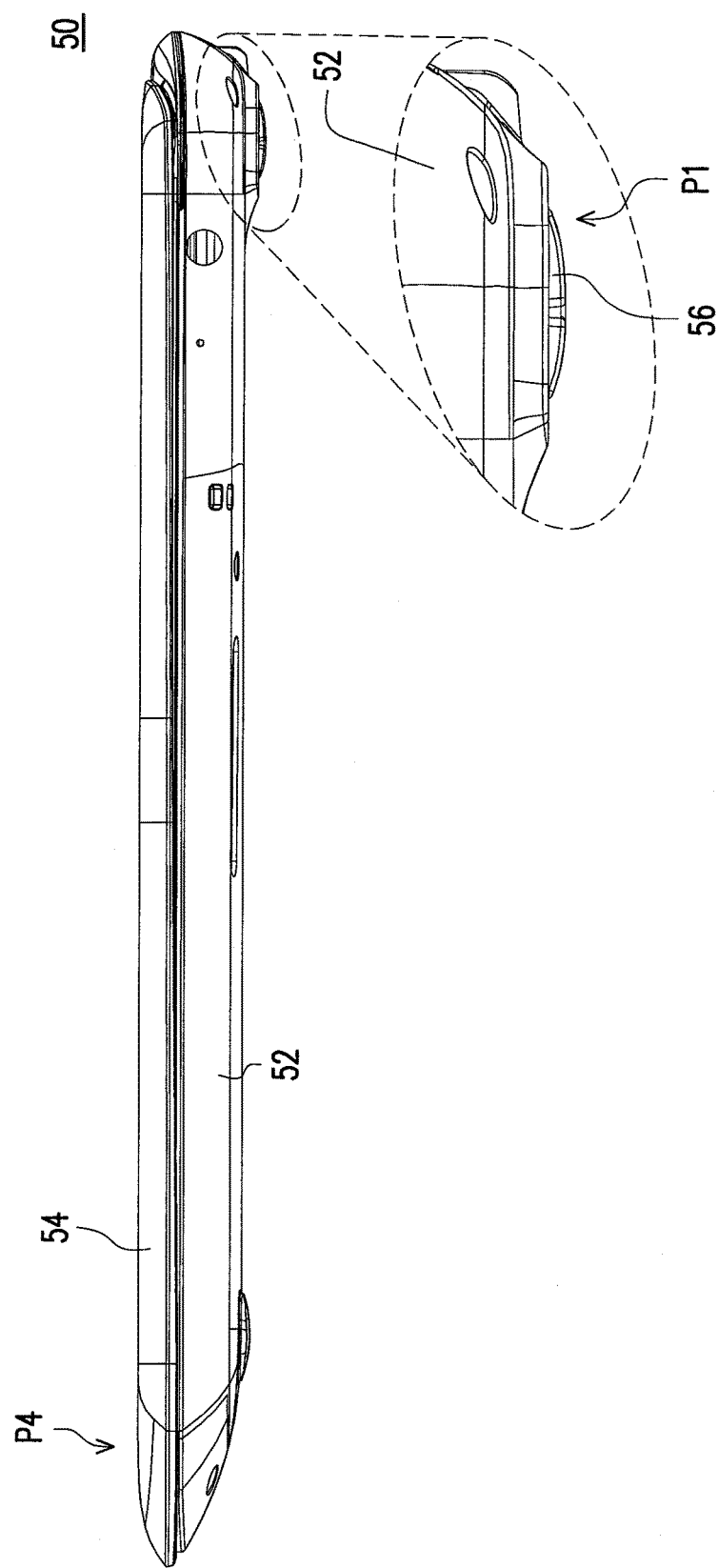
FIG. 10 is a side view of the second body covering the first body in FIG. 1.
Figure 11:
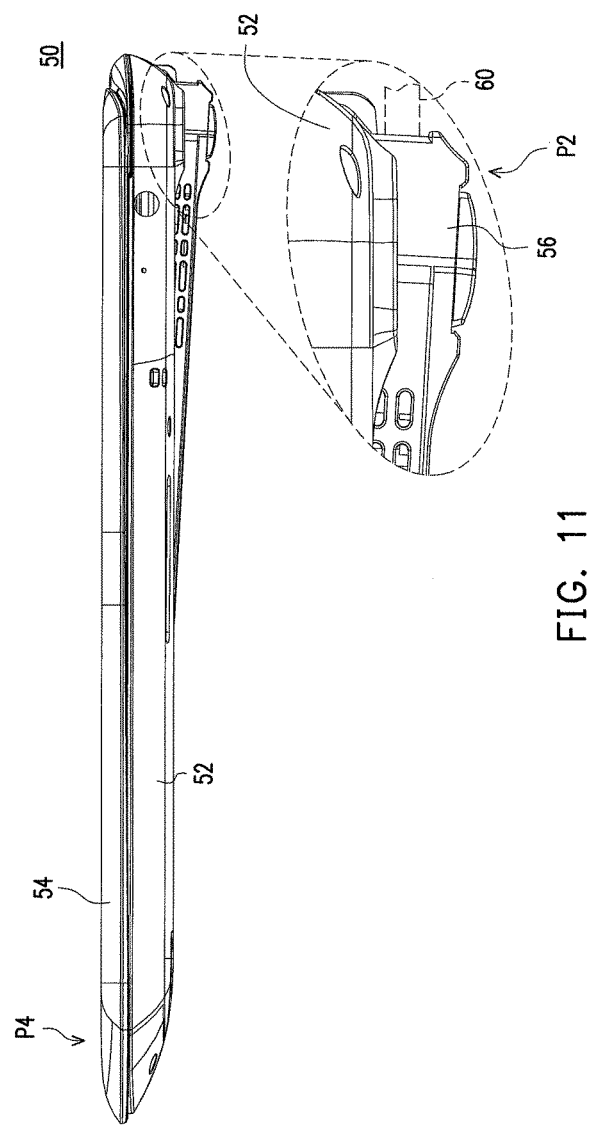
FIG. 11 is a side view of the second body covering the first body in FIG. 2.

FIG. 10 is a side perspective view of the second body covering the first body in FIG. 1. FIG. 11 is a side perspective view of the second body covering the first body in FIG. 2. The second body 54 is suitable for rotating between the raised position in FIG. 1 and FIG. 2 and the closed position in FIG. 10 and FIG. 11 with respect to the first body 52. If the second body 54 rotates to the closed position P4 from the raised position P3, the first body 52 will receive the sleep instruction for driving the electronic device 50 into the sleep mode. The sleep mode may be, for example, but not limited to, a deep sleep shutting down a hard drive of the electronic device or a light sleep without shutting down the hard drive of the electronic device.

Figure 12:
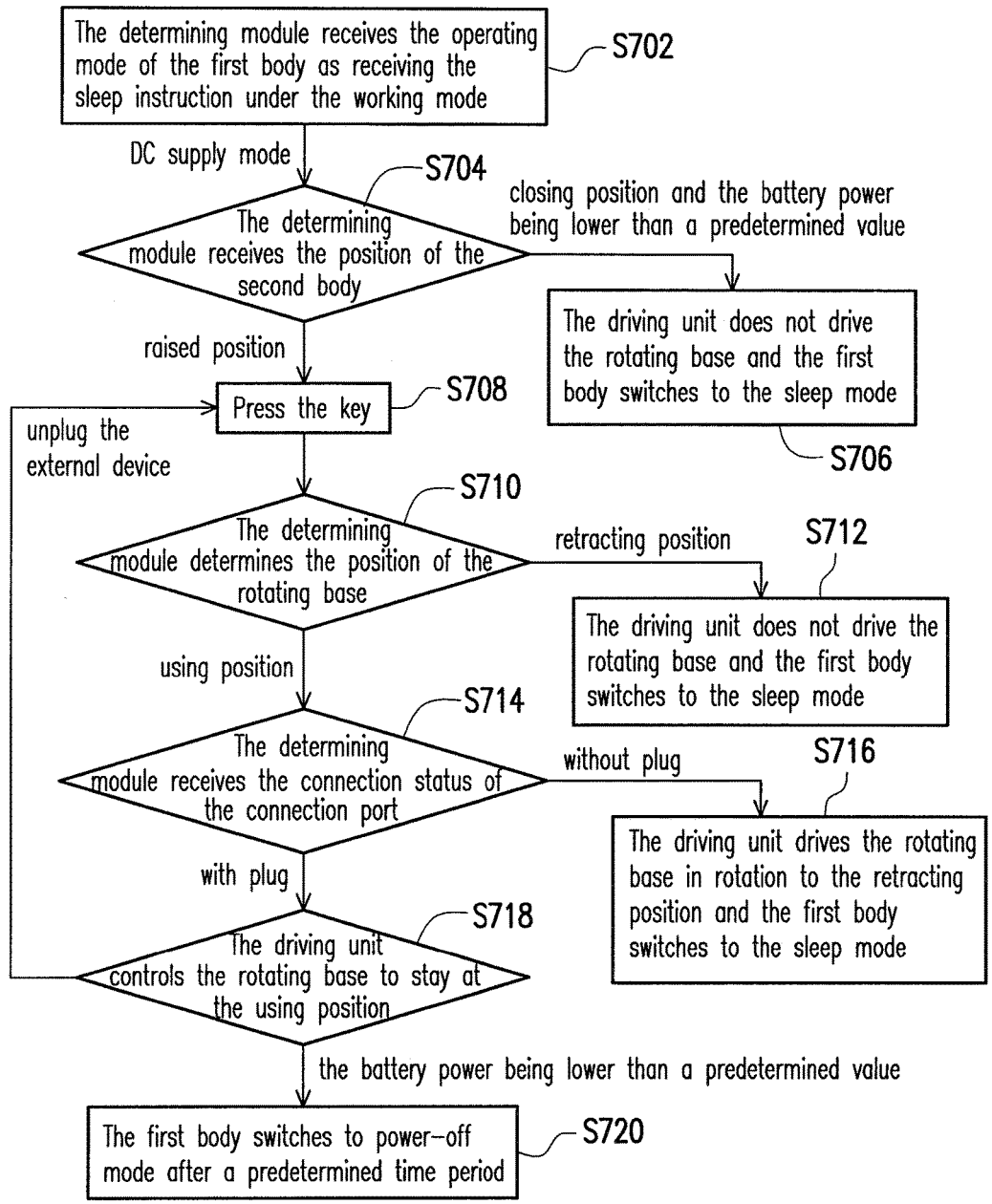
FIG. 12 is a flow chart of the rotating base driving system driving the rotating base in FIG. 3.

The operation status of the electronic device 50 further includes the position of the second body 54. If the first body 52 receives the sleep instruction, the rotating base 56 is able to be controlled by the rotating base driving system 100 through the following flow. FIG. 12 is a flow chart of the rotating base driving system 100 driving the rotating base 56 in FIG. 3. Referring to FIG. 1 to FIG. 3 and FIG. 12, under the condition that the power supply method for the first body 52 received by the determining module 110 is the AC supply mode, if the user covers the second body 54 on the first body 52 so that the determining module 110 receives the operating mode of the first body 52 as receiving the sleep instruction under the working mode (Step S702), then the electronic device will produce a warning sound and the determining module 110 will receive the position of the second body 54 (Step S704). If the second body 54 is not raised by the user and kept at the closed position P4 and if the battery power is lower than a predetermined value, then the driving unit 130 will not drive the rotating base 54 and the first body 52 will switch to the sleep mode (Step S706) for reducing battery power consumption.

In the step S704, if the user raises the second body 54 so that the determining module 110 receives the position of the second body 54 as the raised position P3, then the user is able to press the key (Step S708) triggering the determining module 110 to determine the position of the rotating base 56 (Step S710). If the position of the rotating base 56 is the retracting position P1, then the driving unit 130 will not drive the rotating base 56 and the first body 52 will switch to the sleep mode (Step S712).

In the step S710, if the determining module 110 determines the position of the rotating base 56 as being the using position P2, then the determining module 110 will receive the connection status of the connection port 56a (Step 714). If the connection status of the connection port 56a is a without plug state, then the determining module 110 will transmit the determining signal to the control module 120 and the control unit 120 will further transmit the control signal to the driving unit 130, such that the driving unit 130 drives the rotating base 56 in rotation to the retracting position P1 and the first body 52 switches to the sleep mode (Step S716).

In the step S714, if the connection status of the connection port 56a received by the determining module 10 is a with plug state, then the driving unit 130 will control the rotating base 56 to stay at the using position P2 as illustrated in FIG. 7 (Step S718). Through this, the rotating base 56 will not be able to rotate to the retracting position P1 while the external device 60 is with plug to the connection port 56a, and thus the connection port 56a or the external device 60 may be prevented from damage due to squeezes during the rotation. During the process of the step S718, a warning may be displayed on the display screen of the second body 54 of the electronic device 50 for warning the user to unplug the external device 60. After the user unplugs the external device 60, the user is able to press the key again (Step S708), which allows the rotating base driving system 100 to retract the rotating base 56 through the steps S710, S714, and S716, and the electronic device 50 will sleep. Under the condition that the determining module 110 determines the battery power is lower than a predetermined value, after the completion of the Step S718, the first body 52 will switch to power-off mode after a predetermined time period (Step S720), which will prevent the electronic device 50 from being forced to shut down due to low battery. The predetermined time period may be, for example, but not limited to, 60 seconds or other suitable time period.

Figure 13:
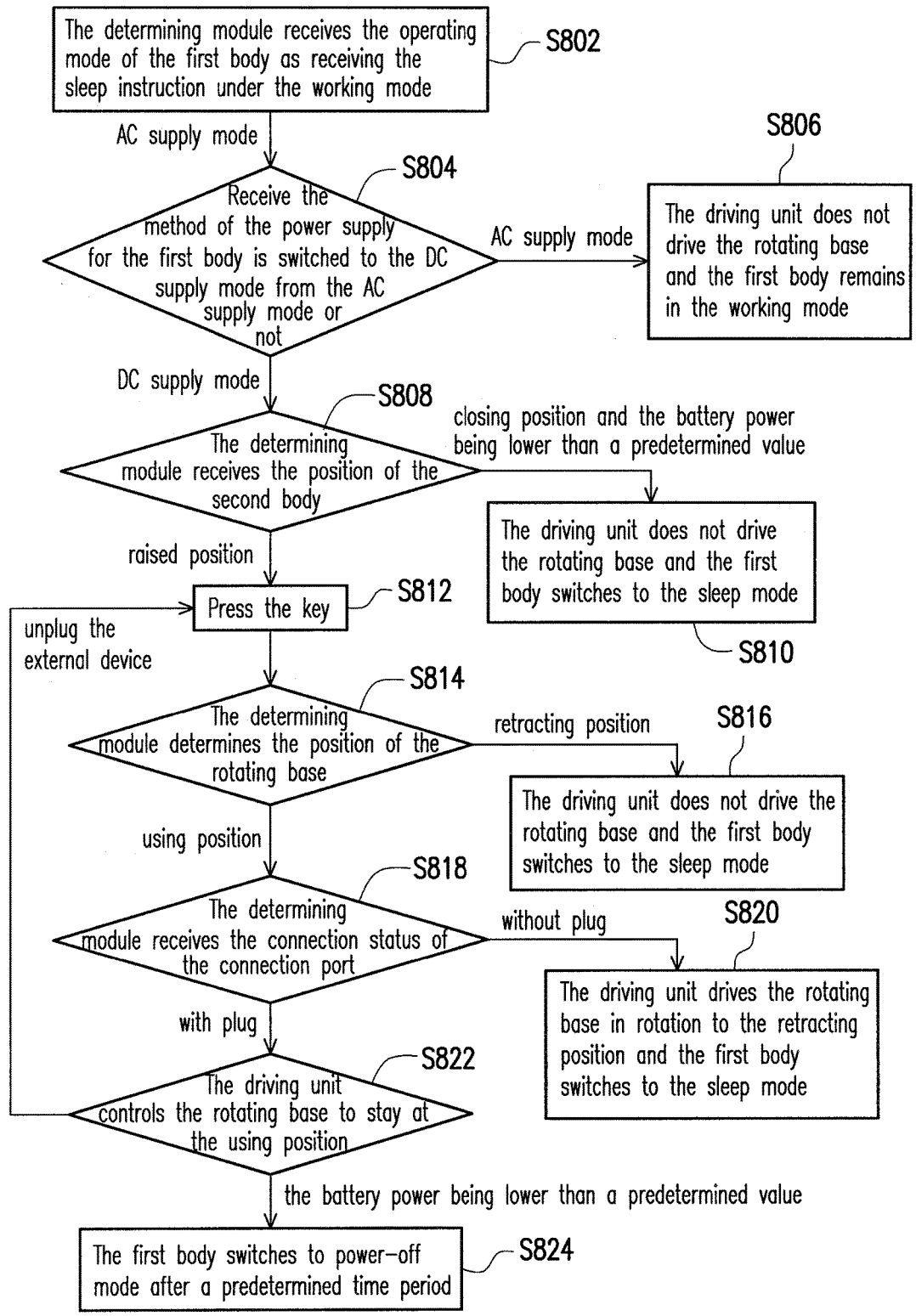
FIG. 13 is a flow chart of the rotating base driving system driving the rotating base in FIG. 3.

When the first body 52 receives the sleep instruction, the rotating base 56 will be able to be controlled by the rotating base driving system 100 through the following flow. FIG. 13 is a flow chart of the rotating base driving system 100 driving the rotating base 56 in FIG. 3. Referring to FIG. 1 to FIG. 3 and FIG. 13, under the condition that the power supply method for the first body 52 received by the determining module 110 is the AC supply mode, if the user covers the second body 54 on the first body 52 so that the determining module 110 receives the operating mode of the first body 52 as receiving the sleep instruction under the working mode (Step S802), then the determining module 110 will receive the method of the power supply for the first body 52 is switched to the DC supply mode from the AC supply mode or not (Step S804). If the method of the power supply for the first body 52 remains the AC supply mode, then the driving unit 130 will not drive the rotating base 56 and the first body 52 will remain in the working mode (Step S806).

In the step S804, if the user unplugs a wire of the AC supply from the electronic device 50 and the method of the power supply is accordingly switched to the DC supply mode, then the steps S808~S824 will be processed. The steps S808-S824 in FIG. 13 are the same as S704~S720 in FIG. 12 and therefore will not be described herein.

Revisiting FIG. 3, the determining module 110 in the present embodiment includes a detecting unit 112 coupled to the first body 52 for detecting the position of the rotating base 56. To be more detailed, the detecting unit 52 includes, for example, a variable resistor coupled between the first body 52 and the rotating base 56. The voltage of the variable resistor changes along with the rotation of the rotating base 56 with respect to the first body 52. Through this, the detecting unit 112 is able to detect whether the rotating base 56 is at the using position P2 or the retracting position P1 based on the voltage of the variable resistor and proceed to the steps S406, S504, S604, S710, and S814. The variable resistor in the present embodiment may be, for example, but not limited to, a linear variable resistor or other suitable types of resistors. In other embodiments, the detecting unit 112 may also include, but not limited to, a lid switch, a capacitor proximity sensor, a photodiode sensor, a pressure sensor, a force sensor or a metal dome to replace the variable resistor for detecting the position of the rotating base.

Furthermore, while the driving unit 130 is driving the rotating base 56 via its motor at a predetermined rotating speed, the rotation angle of the motor of the driving unit 130 and the voltage of the variable resistor correspond to a predetermined relationship. The predetermined relationship is, for example, listed as the following table.

| rotating angle of the motor | voltage of the variable resistor |
| --- | --- |
| 0 | 0.4 volts |
| 10 degrees | 0.5 volts |
| 20 degrees | 0.6 volts |
| 30 degrees | 0.7 volts |
| 40 degrees | 0.8 volts |
| 50 degrees | 0.9 volts |
| 60 degrees | 1.0 volts |
| 70 degrees | 1.1 volts |
| 80 degrees | 1.2 volts |
| 90 degrees | 1.3 volts |
| 100 degrees | 1.4 volts |
| 110 degrees | 1.5 volts |
| 120 degrees | 1.6 volts |
| 130 degrees | 1.7 volts |
| 140 degrees | 1.8 volts |

Through this, the determining unit 110 is able to determine if the rotation status of the motor of the driving unit 130 rotates at the predetermined rotating speed based on the predetermined relationship listed on the above table. If the rotation angle of the motor of the driving unit 130 and the voltage of the variable resistor does not correspond to the predetermined relationship, then the determining module 110 receives the rotation status of the driving unit 130 as not being rotating at the predetermined rotating speed. For example, while the voltage of the variable resistor is 1.2 volts, if the rotation angle of the motor does not reach the corresponding value, 80 degrees, then the determining module 110 will determine that the rotating base 56 is blocked by the finger or the external device 60 with plug to the connection port 56a which causes the motor of the driving unit 130 not being rotate at the predetermined rotating speed.

When the determining module 110 receives the rotation status of the driving unit 130 as not being rotating at the predetermined rotating speed, the driving unit 130 will drive the rotating base 56 to rotate to the initial position based on the control signal. Concretely speaking, when the rotating base 56 rotates from the using position P2 to the retracting position P1 and the determining module 110 receives the rotation status as not being rotating at the predetermined rotating speed, the driving unit 130 will drive the rotating base 56 to rotate to the using position P2 based on the control signal. When the rotating base 56 rotates from the retracting position P1 to the using position P2 and the determining module 110 receives the rotation status as not being rotating at the predetermined rotating speed, the driving unit 130 will drive the rotating base 56 to rotate to the retracting position P1 based on the control signal.

In the present embodiment, for example, the rotation angle of the motor of the driving unit 130 may be obtained by a direct detection for determining if the rotation angle of the motor and the voltage of the variable resistor correspond to the predetermined relationship. Moreover, the predetermined rotation angle may be derived from the rotation time of the motor, and therefore the process to determine if the rotation angle of the motor and the voltage of the variable resistor correspond to the predetermined relationship may be done by verifying the rotation time of the motor and the voltage of the variable resistor.

In other embodiments, the detecting unit 112 may be used for detecting the connection status of the connection port 56a. For example, the detecting unit 112 may include a lid switch. If the external device 60 as illustrated in FIG. 7 is with plug to the connection port 56a and contacts to the lid switch, the detecting unit 112 will be able to detect the connection status of the connection port 56a as being a with plug state. The detecting unit 112 may also include an infrared transmitter sensor. If the external device as illustrated in FIG. 7 is with plug to the connection port 56a and blocks the infrared light emitted from the infrared transmitter sensor, the detecting unit 112 will be able to detect the connection status of the connection port 56a as being a with plug state. The detecting unit 112 may also include a detect pin. If the external device as illustrated in FIG. 7 is with plug to the connection port 56a and conducts the detect pin, the detecting unit 112 will be able to detect the connection status of the connection port 56a as being a with plug state.

Furthermore, the detecting unit 112 is capable of detecting if the rotating base 56 is retracted in position within the predetermined time period for receiving the connection status of the connection port 56a. Concretely speaking, when the motor of the driving unit 130 rotates at a predetermined rotating speed for driving the rotating base 56 to rotate, the rotating base 56 will retract to the retracting position P1 from the using position P2 within a predetermined time period. Through this, if the detecting unit 112 does not detect the rotating base 56 rotating to the retracting position P2 within the predetermined time period, then the determining module 110 will receive the connection status of the connection port 56a, which is with plug by an external device 60 that blocks the rotation of the rotating base 56.

When the determining module 110 receives the connection status of the connection port 56a, which is with plug by an external device 60 that blocks the rotation of the rotating base 56, the driving unit 130 will drive the rotating base 56 to rotate to the initial position based on the control signal. Concretely speaking, when the rotating base 56 rotates from the using position P2 to the retracting position P1 and the determining module 110 receives the connection status of the connection port 56a as with plug by an external device 60 that blocks the rotation of the rotating base, then the driving unit 130 will drive the rotating base 56 to rotate to the using position P2 based on the control signal.

To sum up the above, the rotating base driving system in the present invention receives the operation status of the electronic device via the determining module thereof, such that the driving module is able to control the position of the rotating base based on the operation status of the electronic device. Through this, the rotating base is capable of automatically and properly rotating towards the retracting position or the using position in response to the operating mode of the first body, the position of the rotating base, the connection status of the connection port, the method of the power supply of the first body, the battery power, and the position of the second body for the enhancement of convenience and safety in the operating of the electronic device. Hence, when the rotating base is interfered by the external device or the fingers of the user, damage due to the squeezes of the connection port or the external device and injury of the user's fingers may be prevented during the rotation process of the rotating base.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device comprising: a first body pivoted to a second body with a display; a rotating base pivoted to the first body and suitable for rotating between a using position and a retracting position with respect to the first body, and; a rotating base driving system adapted to determine an operation status of the electronic device and control a movement of the rotating base with respect to the first body, wherein the operation status comprises a connection status of a connection port of the rotating base, and the connection status comprises either a with plug state for indicating that the connection port is connected with an external device outside the electronic device or a without plug state for indicating that the connection port is not connected with the external device outside the electronic device; and the operation status comprises a position of the rotating base, and the determining module comprises a detecting unit adapted to detect the position of the rotating base; and the detecting unit comprises a variable resistor, the variable resistor is coupled between the first body and the rotating base, a voltage of the variable resistor changes along with a rotation of the rotating base with respect to the first body, and the detecting unit detects whether the rotating base is located at the using position or the retracting position based on the voltage.

2. The electronic device of claim 1, wherein the rotating base driving system comprises:

a determining module generating a determining signal based on the operation status of the electronic device;

a control unit generating a control signal based on the determining signal, and;

a driving unit controlling a position of the rotating base based on the control signal.

3. The electronic device of claim 2, wherein the operation status comprises an operating mode of the first body, and the operation status comprises a position of the rotating base.

4. The electronic device of claim 3, wherein the connection port is concealed in the first body when the rotating base is located at the retracting position, and the first body exposes the connection port when the rotating base is located at the using position.

5. The electronic device of claim 3, wherein the determining module receives the operating mode of the first body, the position of the rotating base and the connection status of the connection port sequentially to generate a determining signal.

6. The electronic device of claim 3, wherein the driving unit drives the rotating base to rotate to the using position upon receiving the control signal from the control unit under a condition that the determining module determines the operating mode of the first body being a working mode or a power-off mode and the rotating base being at the retracting position.

7. The electronic device of claim 3, wherein the driving unit drives the rotating base to rotate to the retracting position upon receiving the control signal from the control unit under a condition that the determining module determines the operating mode of the first body being a working mode or a power-off mode, the rotating base being at the using position and the connection status of the connection port comprising the without plug state.

8. The electronic device of claim 3, wherein the driving unit controls the rotating base to stay at the using position upon receiving the control signal from the control unit under a condition that the determining module determines the operating mode of the first body being a working mode or a power-off mode, the rotating base being at the using position and the connection status of the connection port comprising the with plug state.

9. The electronic device of claim 3, wherein the rotating base stays at the retracting position and the first body is switched to a power-off mode under a condition that the determining module determines the operating mode of the first body indicating that the first body receives a power-off instruction under a working mode and the rotating base being at the retracting position.

10. The electronic device of claim 3, wherein the driving unit drives the rotating base to rotate to the retracting position upon receiving the control signal from the control unit and the first body is switched to a power-off mode under a condition that the determining module determines the operating mode of the first body indicating that the first body receives a power-off instruction under a working mode, the rotating base being at the using position and the connection status of the connection port comprising the without plug state.

11. The electronic device of claim 3, wherein the operation status further comprises a power supply method for the first body, wherein the driving unit controls the rotating base to stay at the using position upon receiving the control signal from the control unit and the first body remains in the working mode under a condition that the determining module determines the power supply method for the first body being a AC supply mode, the operating mode of the first body indicating that the first body receives a power-off instruction under a working mode, the rotating base being at the using position and the connection status of the connection port comprising the with plug state.

12. The electronic device of claim 3, wherein the operation status further comprises a power supply method for the first body and a battery power of the electronic device, wherein the driving unit controls the rotating base to stay at the using position upon receiving the control signal from the control unit and the first body is switched to a power-off mode after a predetermined time period under a condition that the determining module determines the power supply method being a DC supply mode, the operating mode of the first body indicating that the first body receives a power-off instruction under a working mode, the rotating base being at the using position, the connection status of the connection port comprising the with plug state and the battery power being lower than a predetermined value.

13. The electronic device of claim 3, wherein the electronic device further comprises a second body, and the second body is pivoted to the first body and suitable for pivotally rotating between a raised position and a closed position with respect to the first body; wherein the first body receives a sleep instruction when the second body pivotally rotates from the raised position to the closed position.

14. The electronic device of claim 13, wherein the operation status further comprises a power supply method for the first body, a position of the second body and a battery power of the electronic device, wherein the first body is switched to a sleep mode under a condition that the determining module determines the power supply method being a DC supply mode, the operating mode of the first body indicating that the first body receives a sleep instruction under a working mode, the second body being at the closed position and the battery power being lower than a predetermined value.

15. The electronic device of claim 13, wherein the operation status further comprises a power supply method for the first body and a position of the second body, wherein the rotating base stays at the retracting position and the first body is switched to a sleep mode under a condition that the determining module determines the power supply method being a DC supply mode, the operating mode of the first body indicating that the first body receives a sleep instruction under a working mode, the second body being at the raised position and the rotating base being at the retracting position.

16. The electronic device of claim 13, wherein the operation status further comprises a power supply method for the first body and a position of the second body, wherein the driving unit drives the rotating base to rotate to the retracting position upon receiving the control signal from the control unit and the first body is switched to a sleep mode under a condition that the determining module determines the power supply method being a DC supply mode, the operating mode of the first body indicating that the first body receives a sleep instruction under a working mode, the second body being at the raised position, the rotating base is at the using position and the connection status of the connection port comprising the without plug state.

17. The electronic device of claim 13, wherein the operation status further comprises a power supply method for the first body, a position of the second body and a battery power of the electronic device, wherein the driving unit controls the rotating base to stay at the using position upon receiving the control signal from the control unit and the first body is switched to a power-off mode after a predetermined time period under a condition that the determining module determines the power supply method being a DC supply mode, the operating mode of the first body indicating that the first body receives a sleep instruction under a working mode, the second body being at the raised position, the rotating base being at the using position, the connection status of the connection port comprising the with plug state and the battery power being lower than a predetermined value.

18. The electronic device of claim 3, wherein the operation status further comprises a power supply method for the first body, wherein the first body remains in the working mode under a condition that the determining module determines the power supply method for the first body being a AC supply mode and the operating mode of the first body indicating that the first body receives a sleep instruction under a working mode.

19. The electronic device of claim 2, wherein the driving unit comprises a motor, wherein a rotation angle of the motor and the voltage correspond to a predetermined relationship when a rotation status of the motor is that the motor rotates at a predetermined rotating speed to drive the rotating base to rotate, and the determining module receives the rotation status of the motor as not being rotating at the predetermined rotating speed when the rotation angle of the motor and the voltage does not correspond to the predetermined relationship.

20. The electronic device of claim 19, wherein the driving unit drives the rotating base to rotate to the using position when the rotating base rotates from the using position to the retracting position and the rotation status of the motor is that the motor does not rotate at the predetermined rotating speed, and the driving unit drives the rotating base to rotate to the retracting position when the rotating base rotates from the retracting position to the using position and the rotation status of the motor is that the motor does not rotate at the predetermined rotating speed.

21. The electronic device of claim 2, wherein the detecting unit comprises a lid switch, a capacitor proximity sensor, a photodiode sensor, a pressure sensor, a force sensor or a metal dome.

22. The electronic device of claim 2, wherein the determining module comprises a detecting unit adapted to detect the connection status of the connection port.

23. The electronic device of claim 22, wherein the detecting unit comprises a lid switch, an infrared transmitter sensor, or a detect pin.

24. The electronic device of claim 22, wherein the driving unit comprises a motor; wherein the rotating base is driven by the motor to rotate from the using position to the retracting position within a predetermined time period when the motor rotates at a predetermined rotating speed, and the connection status received by the determining module is the with plug state when the detecting unit does not detect the rotating base rotating to the retracting position within the predetermined time period.

25. The electronic device of claim 24, wherein the driving unit drives the rotating base to rotate to the using position upon receiving the control signal from the control unit under a condition that the rotating base is previously rotated from the using position to the retracting position and the connection status of the connection port is the with plug state.

* * * * *